(12) United States Patent
Winterot et al.

(10) Patent No.: US 9,684,149 B2
(45) Date of Patent: Jun. 20, 2017

(54) COORDINATE MEASURING MACHINE AND METHOD FOR DETERMINING SPATIAL COORDINATES ON A MEASUREMENT OBJECT

(71) Applicant: Carl Zeiss Industrielle Messtechnik GmbH, Oberkochen (DE)

(72) Inventors: Johannes Winterot, Jena (DE); Thomas Engel, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 724 days.

(21) Appl. No.: 13/960,828

(22) Filed: Aug. 7, 2013

(65) Prior Publication Data
US 2014/0043470 A1 Feb. 13, 2014

Related U.S. Application Data

(63) Continuation of application No. PCT/EP2012/065396, filed on Aug. 7, 2012.
(Continued)

(51) Int. Cl.
*G02B 9/34* (2006.01)
*G02B 21/00* (2006.01)
(Continued)

(52) U.S. Cl.
CPC ........... *G02B 9/34* (2013.01); *G02B 21/0016* (2013.01); *G02B 21/025* (2013.01); *G02B 21/088* (2013.01); *G02B 21/364* (2013.01)

(58) Field of Classification Search
None
See application file for complete search history.

(56) References Cited

U.S. PATENT DOCUMENTS

| | | | |
|---|---|---|---|
| 4,008,951 A | 2/1977 | Himmelsbach | |
| 4,911,307 A | 3/1990 | Jennings | |

(Continued)

FOREIGN PATENT DOCUMENTS

| | | |
|---|---|---|
| DE | 2 410 744 | 9/1974 |
| DE | 24 25 645 | 9/1975 |

(Continued)

*Primary Examiner* — Andy Rao
*Assistant Examiner* — Tyler Edwards
(74) *Attorney, Agent, or Firm* — Harness, Dickey & Pierce, P.L.C.

(57) ABSTRACT

A coordinate measuring machine has a workpiece support for holding a measurement object and a measuring head which can be displaced relative to the workpiece support. The measuring head carries an optical sensor. An evaluation and control unit is configured to determine spatial coordinates on the measurement object depending on a position of the measuring head relative to the workpiece support and depending on sensor data from the optical sensor. The optical sensor includes a lens assembly and a camera. The lens assembly comprises at least four separate lens-element groups. Three of these separate lens-element groups can be displaced along the optical axis of the lens assembly. A first lens-element group is arranged fixed in the region of the light-entry opening of the lens assembly. The coordinate measuring machine with the above-described lens assembly allows individual variation of magnification, focusing and resolution.

15 Claims, 5 Drawing Sheets

Related U.S. Application Data

(60) Provisional application No. 61/680,350, filed on Aug. 7, 2012.

(51) Int. Cl.
  *G02B 21/02* (2006.01)
  *G02B 21/08* (2006.01)
  *G02B 21/36* (2006.01)

(56) References Cited

U.S. PATENT DOCUMENTS

| | | |
|---|---|---|
| 5,523,583 A | 6/1996 | Choate |
| 5,668,665 A | 9/1997 | Choate |
| 5,708,532 A | 1/1998 | Wartmann |
| 6,292,306 B1 * | 9/2001 | Betensky ............... G02B 13/22 359/663 |
| 6,822,749 B1 | 11/2004 | Christoph |
| 7,369,313 B2 * | 5/2008 | Otake ............... G02B 15/173 348/208.11 |
| 2003/0043355 A1 | 3/2003 | Nagahama et al. |
| 2005/0007480 A1 | 1/2005 | Hamano et al. |
| 2005/0052753 A1 | 3/2005 | Kanai |
| 2009/0059208 A1 | 3/2009 | Steffens et al. |
| 2009/0128924 A1 | 5/2009 | Yamada |
| 2009/0213328 A1 | 8/2009 | Isobe et al. |

FOREIGN PATENT DOCUMENTS

| | | |
|---|---|---|
| DE | 26 11 639 | 9/1977 |
| DE | 198 16 270 A1 | 10/1999 |
| DE | 100 34 252 A1 | 1/2002 |
| EP | 0 747 743 A1 | 12/1996 |
| EP | 1 071 922 B1 | 1/2001 |
| GB | 1 467 664 | 3/1977 |
| GB | 1 532 576 | 11/1978 |
| JP | 2011-169661 | 9/2011 |

* cited by examiner

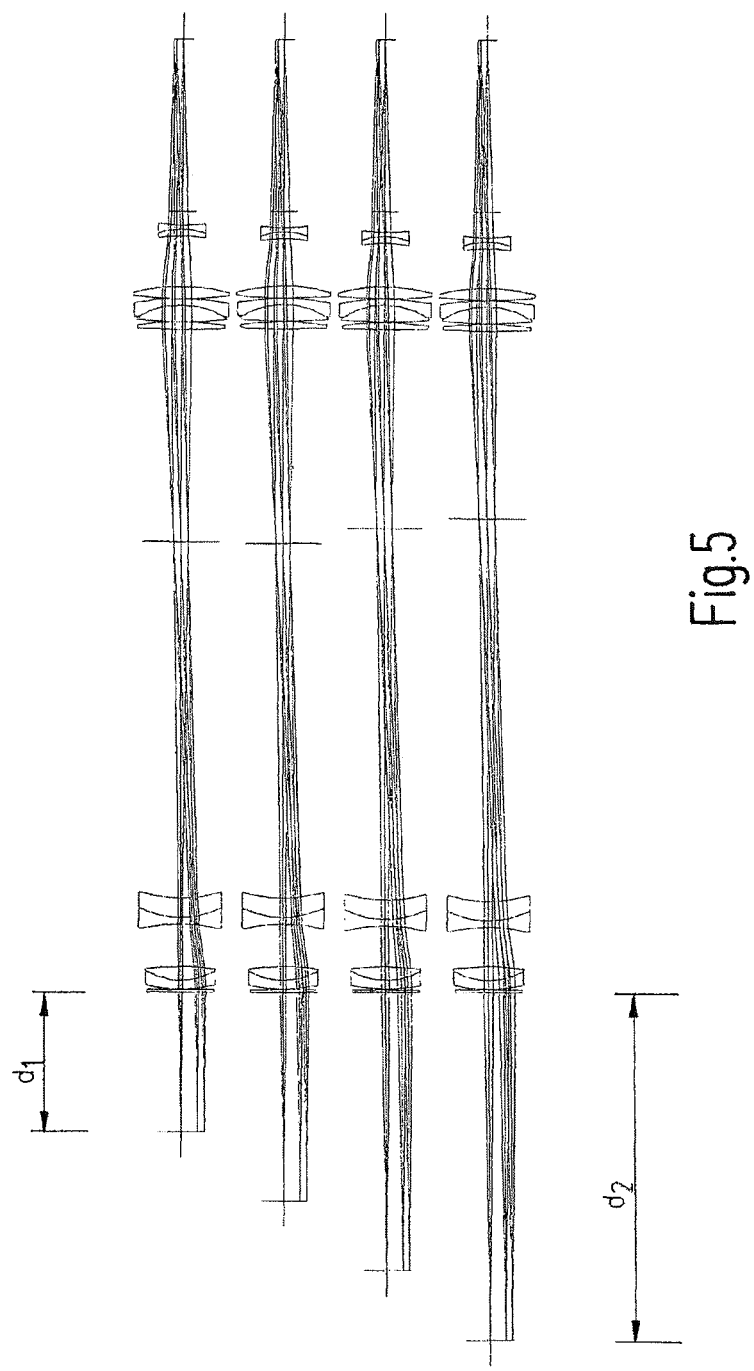

COORDINATE MEASURING MACHINE AND METHOD FOR DETERMINING SPATIAL COORDINATES ON A MEASUREMENT OBJECT

CROSS-REFERENCES TO RELATED APPLICATIONS

This application is a continuation of International PCT application No. PCT/EP2012/065396, filed on Aug. 7, 2012. This application also claims priority from U.S. provisional application No. 61/680,350, filed on Aug. 7, 2012. The entire contents of these prior applications are incorporated herein by reference.

BACKGROUND OF THE INVENTION

The present invention relates to a coordinate measuring machine and method for determining spatial coordinates on a measurement object.

EP 1 071 922 B1 discloses a prior art coordinate measuring machine and a corresponding method. The known coordinate measuring machine has a probe element, which is arranged at the end of an elastically flexible optical fiber. The probe element serves to touch a measurement point on a measurement object. By using an optical sensor, which includes a camera and a lens assembly, it is possible to detect deflections of the probe element when probing the measurement object. On the basis of the deflection of the probe element and on the basis of the position of the optical sensor relative to the measurement object, if desired, it is then possible to determine spatial coordinates for the probed measurement point. Alternatively, the known coordinate measuring machine is supposed to offer the option of measuring the surface topography of a measurement object without using the probe element, i.e. in a purely optical fashion. EP 1 071 922 B1 proposes that the optical sensor comprises a zoom optics with two lens-element groups, which, with the aid of motors, are moved separately into positions for magnification and distance from the measurement object. This is supposed to make it possible to remove the probe element from the depth-of-field range of the optical unit in order to enable a purely optical measurement, if desired.

JP 2011-169661 discloses an optical measuring machine with a camera and a telecentric optical system that comprises a front lens element, a rear lens element and a telecentric stop. The measuring machine further comprises a laser-based autofocus system, which determines a position of the measurement object on the optical axis of the telecentric system with the aid of laser light.

The use of optical sensors in conjunction with coordinate measuring machines makes it possible, in many cases, to measure geometric properties of a measurement object very quickly. A disadvantage of known coordinate measuring machines with optical systems until now lies in the fact that the optical sensors are restricted to specific measurement tasks and specific workpiece properties. The optical sensors are generally optimized for a specific type of measurement object, for example in respect of the achievable measurement accuracy or the measurement region. By way of example, workpieces that have great height differences in the direction of the optical axis of the sensor may cause problems. In part, use is made of different optical and/or tactile sensors in order to be able to flexibly react to different measurement requirements, wherein the individual sensors each only assume part of the overall measurement object. In general, each individual sensor is optimized for a specific measurement object. Particularly, optical sensors therefore comprise an individual optical system that is well-suited to one specific purpose but less well-suited to other purposes.

Providing different sensors for various measurement objects in a coordinate measuring machine enables high flexibility in conjunction with high measurement accuracy. Disadvantages include the high costs for providing the plurality of sensors, each having optics adapted to the specific purpose. Moreover, the plurality of sensors, each with individual optics, require a relatively large installation space in the coordinate measuring machine, which restricts the measurement volume and incurs further costs.

SUMMARY OF THE INVENTION

There is a desire for an optical coordinate measuring machine and method that can carry out a large spectrum of optical measurements at low costs. Accordingly, it is an object of the present invention to provide a corresponding coordinate measuring machine and method.

According to one aspect of the present invention, there is provided a coordinate measuring machine for determining spatial coordinates on a measurement object, comprising a workpiece support for holding the measurement object, comprising a measuring head which can be displaced relative to the workpiece support and which carries an optical sensor, and comprising an evaluation and control unit configured to determine spatial coordinates on the measurement object depending on a position of the measuring head relative to the workpiece support and depending on sensor data from the optical sensor, wherein the optical sensor includes a lens assembly and a camera configured to record an image of the measurement object through the lens assembly, wherein the lens assembly has a lens body having a light-entry opening and a light-exit opening with an interface for connecting the camera, wherein the lens assembly further has a stop and a plurality of lens elements defining an optical axis and forming a first lens-element group, a second lens-element group, a third lens-element group and a fourth lens-element group, wherein the first lens-element group is arranged fixed in the region of the light-entry opening, wherein the second lens-element group is arranged between the first lens-element group and the stop, wherein the third lens-element group and the fourth lens-element group are arranged between the stop and the light-exit opening, and wherein the stop and the second lens-element group, the third lens-element group and the fourth lens-element group each are individually moveable relative to the first lens-element group along the optical axis.

According to a another aspect, there is provided a method for determining spatial coordinates on a measurement object, comprising the steps of arranging the measurement object on a workpiece support, providing a measuring head, which comprises a lens assembly and a camera, wherein the lens assembly comprises a lens body which has a light-entry opening and a light-exit opening with an interface for connecting the camera, positioning the measuring head relative to the workpiece support, recording at least one image of the measurement object through the lens assembly, and determining the spatial coordinates on the measurement object depending on the position of the measuring head relative to the workpiece support and depending on the image, wherein the lens assembly comprises a stop and a plurality of lens elements which are arranged in the lens body, wherein the lens elements form at least four separate lens-element groups which together define an optical axis, and wherein at least two of the four lens-element groups are moveable along the optical axis, wherein a first lens-element group of the at least four lens-element groups is arranged fixed in the region of the light-entry opening, and the stop and a second lens-element group, a third lens-element group and a fourth lens-element group of the at least four lens-element groups are individually moved relative to the first lens-element group along the optical axis in order to achieve both a predefined magnification and predefined focusing of the measurement object in the image, wherein the second lens-element group is arranged between the first lens-element group and the stop and wherein the third and fourth lens-element groups are arranged between the stop and the light-exit opening.

According to a yet another aspect, there is provided a lens assembly for an optical coordinate measuring machine for determining spatial coordinates on a measurement object, the lens assembly comprising a lens body which has a light-entry opening and a light-exit opening with an interface for connecting a camera, comprising a plurality of lens elements and a stop which are arranged in the lens body, wherein the lens elements form at least four separate lens-element groups which together define an optical axis, and wherein at least two of the four lens-element groups can be displaced along the optical axis, wherein a first lens-element group of the at least four lens-element groups is arranged fixed in the region of the light-entry opening and the stop and a second lens-element group, a third lens-element group and a fourth lens-element group of the at least four lens-element groups are individually moveable relative to the first lens-element group along the optical axis, wherein the second lens-element group is arranged between the first lens-element group and the stop, and wherein the third and fourth lens-element groups are arranged between the stop and the light-exit opening.

The novel coordinate measuring machine and method employ a novel lens assembly, in which at least four separate lens-element groups, which are spatially separated from one another, are arranged on a common optical axis. The first lens-element group (as seen from the light-entry opening or front side) is fixed. It therefore has a constant, defined distance from the interface for connecting the camera. In some exemplary embodiments, the interface is a standard interface for connecting cameras, e.g. a so-called C-mount or an F-mount. In other exemplary embodiments, the interface is a proprietary interface, in which the camera is screwed to the lens body. This proprietary interface offers higher stability and thereby facilitates a high measurement accuracy to be maintained.

After the first lens-element group, three further lens-element groups, each of which can be moved or displaced along the optical axis relative to the first lens-element group, follow along the optical axis. Preferably, each of the four lens-element groups comprises at least one transparent optical element with two refractive surfaces, of which at least one surface is arced in a convex or concave manner. It is also preferable for each of the lens-element groups to be rotationally symmetric with respect to the optical axis.

In some exemplary embodiments, the novel lens assembly can comprise a fifth lens-element group, which is arranged in the region of the light-exit opening and is preferably fixed. In principle, further lens-element groups are possible, but it is preferable for the novel lens assembly not to have more than the five aforementioned lens-element groups. Together, the four or five lens-element groups generate an image on an image sensor, which is coupled to the lens assembly via the interface. As a result of the individual movability of the three lens-element groups and the stop, the novel lens assembly can be set very flexibly to different imaging conditions. As explained below on the basis of a preferred exemplary embodiment, the new lens assembly in particular allows a variable setting of the magnification with substantially constant working distance, and a variable setting of the working distance with substantially constant magnification. In the preferred exemplary embodiments, the novel lens is telecentric over the whole setting range of the magnification and over the whole setting range of the working distance, which can be achieved very well with the aid of the axially moveable stop. These properties make it possible to measure a measurement object, which has large height differences in the direction of the optical axis of the lens assembly, with substantially constant measurement parameters, without the optical sensor as such having to be moved closer to the measurement object or further away from the measurement object. This enables very fast measurements at a plurality of measurement points. Moreover, an advantage of the fixed first lens-element group is that the "interference contour" of the optical sensor in the measurement volume of the coordinate measuring machine is always the same. The risk of the sensor colliding with the measurement object during a comprehensive measurement is reduced.

The novel coordinate measuring machine and the corresponding lens assembly make it possible to dispense with interchangeable optical units as a result of the variable adjustability, said interchangeable optical units being partly used in previous coordinate measuring machines for carrying out different measurement tasks. At least it is possible to reduce the number of interchangeable optical units significantly.

As a result of the high flexibility, the lens assembly of the novel coordinate measuring machine is able to interact with different optical sensors. In a preferred exemplary embodiment, the lens assembly is selectively be combined with an autofocus sensor, a confocal white-light sensor, a triangulation sensor or the like, wherein the image recording and the coupling and decoupling of specific illuminations, which may be required for the various sensor principles, can respectively take place in or through the novel lens assembly. In other words, the novel coordinate measuring machine offers the possibility of coupling various sensor principles to a uniform lens assembly, which, as a result of the four specified lens-element groups and the axially displaceable stop, offers sufficient flexibility for interacting with the various sensor principles.

The novel coordinate measuring machine can therefore be realized rather cost-effectively. Moreover, the novel coordinate measuring machine saves installation space, which was previously required for providing interchangeable optical units and/or housing several lens assemblies in the measuring head.

In a preferred refinement of the invention, individual (predefined) control curves for the second, third and fourth lens-element groups and for the stop are provided, for example stored in a memory in the evaluation and control unit. The second, third and fourth lens-element groups and the stop each can be individually positioned along the optical axis as a function of the individual control curves. Accordingly, the novel lens assembly is designed such that the second, third and fourth lens-element groups and the stop each can be adjusted along the optical axis depending on individual control curves for each of the moveable elements. The novel method employs individual control curves in preferred refinements in order to set the respective position of the second, third and fourth lens-element groups and of the stop along the optical axis.

In some exemplary embodiments, the lens assembly has an internal design in which the second, third and fourth lens-element groups and/or the stop are mechanically coupled to one another, for example via disk cams and/or gears. In this case, the individual control curves for the moveable elements are implemented by the mechanical design of the disk cams or gears. In other exemplary embodiments, the lens assembly comprises an electric and/or optical interface for transmitting control signals, which represent the individual control curves, and the lens assembly comprises an electric drive for each element to be moved. In some variants, the novel lens assembly includes an electronic memory, which can be integrated in the lens body or be provided separately from the lens body, wherein the individual control curves are stored in the memory in the form of data structures. The memory might be a non-volatile memory, such as a ROM or EEPROM.

In further exemplary embodiments, it is possible for individual elements of the second, third and fourth lens-element groups and/or stop to be coupled mechanically to one another and therefore be adjustable along the optical axis in a mechanically coupled fashion, while other elements of the second, third and fourth lens-element groups and stop are formed without mechanical coupling. Control of the mechanically uncoupled elements is brought about by an optical and/or electric interface of the lens assembly and by individual drives.

The control curves for the second, third and fourth lens-element groups and for the stop each differ from another, which allows the individual movement of the second, third, fourth lens-element groups and the stop. In other words, the second, third, fourth lens-element groups and the stop move along different trajectories when magnification and focusing are set for a defined measurement task.

The control curves advantageously represent a dependence of the respective individual position of the elements on external set values, such as, a magnification prescribed by the user and a prescribed working distance and corresponding focusing. Further set values can be a desired resolution or a combination of these set values, which emerges from a defined measurement task. The individual control curves form a family of curves, which, in some exemplary embodiments, represent a two-dimensional dependence of the individual positions of the elements along the optical axis on the desired magnification and on the desired focusing. Thus, in these exemplary embodiments, the control curves form a 2D family of curves, which represents an individual position for all adjustable elements, wherein said individual position of one element, however, is adapted to the individual positions of the other elements. For each selectable working distance, there is a 1D family of curves which defines the magnification and the corresponding individual positions of the elements. Conversely, there is a different 1D family of curves, which determines the individual positions for different focusing, for each selected magnification.

The refinement makes it easier for the user of the novel coordinate measuring machine and the novel method by virtue of predefined individual positions for various optical scenarios (set values) being provided in sets. The user can concentrate on the optical set values, which he requires for a specific measurement task, and needs not worry about the details of the novel lens assembly which are important for achieving an optimum imaging quality. This refinement therefore simplifies the use of the novel lens assembly in the novel coordinate measuring machine and of the novel method, and it enables a faster implementation of a novel measurement task.

In preferred exemplary embodiments, the individual control curves comprise several predefined sets of control curves, wherein a first set is selected such that an image recorded through the lens assembly is kept largely constantly in focus during an adjustment of the image size and/or resolution (constant focusing in the case of variable magnification). A second set is preferably selected in such a way that the movable elements approach their respective set position at maximum speed, with unsharpness during the adjustment being accepted. A further set is preferably selected in such a way that the elements each are adjusted synchronously to one another, wherein the image size is kept constant over various working distances/different focusing.

In a further refinement, therefore, the individual control curves are configured to alternatively generate a variable magnification with substantially constant focusing on a defined working distance or variable focusing on different working distances with substantially constant magnification.

As already indicated above, the control curves define an individual dependence of the position of the adjustable elements along the optical axis on desired focusing and a desired magnification. The curves are different for each lens-element group and the stop. In preferred exemplary embodiments, the second and third lens-element groups are close together at a high magnification, while the distances to the first and fourth lens-element groups are relatively large. At maximum magnification, the fourth lens-element group preferably acts as a pure projection lens, which shifts the image cast by the first, second and third lens-element groups into the plane of the image sensor of the connected camera. By contrast, at the lowest magnification, the second lens-element group is closest to the first lens-element group (minimum distance between the first and second lens-element groups), and the third and fourth lens-element groups are close to one another. The refinement allows a very simple operation of the novel lens and of the coordinate measuring machine based thereon, and it therefore contributes to a user being able to carry out a new measurement object relatively quickly.

In a further refinement, the first and second lens-element groups together define a focus (and hence also a focal plane perpendicular to the optical axis), which lies between the second and third lens-element groups, wherein the stop and the second lens-element group are adapted to one another in such a way that the stop is always arranged in the focus or the focal plane. The control curves for the stop and the second lens-element group are preferably adapted to one another in a corresponding fashion. In particular, it is advantageous, if the second lens-element group and the stop move in opposite directions along the optical axis, when magnification and/or focusing are adjusted to a defined measurement task.

This refinement enables object-sided telecentricity over all magnifications and working distances in a cost effective manner. The object-sided telecentricity is advantageous for determining, in particular, the depth of bores, projections or recesses in a measurement object because the "view" on the measurement object remains largely constant despite the working distances differing in these cases. An object-sided telecentricity advantageously avoids a perspective distortion of the measurement object.

In a further refinement, the stop has a variable aperture (stop diameter), which preferably varies depending on the position of the stop along the optical axis.

In this refinement, the novel lens has a yet another degree of freedom, namely the aperture diameter of the stop. This makes it possible to modify the numerical aperture of the lens assembly and thus vary the resolution of the lens assembly. In preferred exemplary embodiments, the control curves mentioned above, including the individual control curve for the aperture, are configured in such a way that the lens assembly offers an operating mode with a constant image-sided numerical aperture over various working distances. This operating mode is advantageous for being able to work with constantly high measurement accuracy over various working distances. Furthermore, it is preferable for the control curves to be configured in such a way that the lens assembly enables an operating mode with a maximum aperture in each case.

In preferred exemplary embodiments, the stop lies centrally with respect to the optical axis, preferably with a centering error that is less than 20 μm and more preferably less than 10 μm. The stop is preferably an iris diaphragm, which can be individually actuated by motor, wherein the actuation occurs using a control curve that is part of the aforementioned family of curves. These exemplary embodiments allow a simple implementation and constantly high measurement accuracy over the whole working range.

In a further refinement, the lens assembly comprises a plurality of carriages and motor drives, wherein the second, third and fourth lens-element groups and the stop each are coupled to their own carriage, which can be adjusted along the optical axis, and wherein the carriages can be individually moved using the motor drives.

In the preferred refinement, the elements which can be positioned along the optical axis each are coupled to a motor drive of their own. In some exemplary embodiments, the drive is a stepper motor, which preferably operates in the full-step operation since the result of this is a low heat influx into the lens assembly. The refinement enables a modular and comparatively cost-effective implementation.

In a further refinement, the first lens-element group has positive refractive power. The second lens-element group preferably has negative refractive power, the third lens-element group preferably has positive refractive power and the fourth lens-element group preferably has negative refractive power.

In practical tests, this refinement was found to be very advantageous for achieving a compact design and a small interference contour of the lens assembly in the measurement volume of the novel coordinate measuring machine.

In a further refinement, there is a clear space, in which a beam splitter is arranged in preferred exemplary embodiments, between the first and second lens-element groups in the lens body. In a particularly preferred variant, there is a further interface on the lens body, in the vicinity of the beam splitter, by means of which interface a defined illumination can be coupled into the lens assembly and/or an image only generated by the first lens-element group can be decoupled.

In this refinement, there is a defined minimum distance between the first lens-element group and the displaceable second lens-element group, wherein the second lens-element group cannot come closer to the first lens-element group than said minimum distance. The clear space makes it possible to house a beam splitter in the optical beam path, which beam splitter allows to couple in or decouple light "very far toward the front". The refinement increases the flexibility of the novel lens assembly, because, in particular, it simplifies coupling in defined illuminations for various sensor principles. By way of example, a confocal white-light sensor (chromatic white-light sensor) is connected to the further interface in some exemplary embodiments of the coordinate measuring machine. In some exemplary embodiments, the first lens-element group generates a defined longitudinal chromatic aberration, i.e. the focusing plane of the first lens-element group varies in a defined fashion depending on the wavelength of the light passing through. The defined longitudinal chromatic aberration has an order of magnitude which could be reduced using common corrections conventional in the art. In other words, the longitudinal aberration is caused "deliberately" and is not only the result of manufacturing tolerances. A confocal white-light sensor can then determine the elevation of the reflected workpiece surface relative to the lens assembly from reflections, which reach the sensor from the workpiece surface through the first lens-element group, and on the basis of a spectral evaluation of the reflections. The clear space remaining in the lens body between the first and second lens-element groups allows to employ a longitudinal chromatic aberration of the first lens-element group for such a confocal white-light sensor, while a correction on the further beam path to the light-exit opening is achieved for the camera with the aid of the further lens-element groups. The provision of the clear space between the first and second lens-element groups was therefore found to be a very advantageous realization.

In further exemplary embodiments, a strip pattern or another structured illumination can be coupled in via the further interface, which structured illumination is, for example, analyzed on the basis of the image recorded by the camera in order to measure a measurement object. A further clear space is preferably provided between the fourth lens-element group and the light-exit opening of the lens, in which clear space a beam splitter is likewise arranged. A third interface is preferably arranged in the vicinity of the further beam splitter such that it is also possible to couple in and decouple illumination and/or signals behind the optical system made of the four lens-element groups. The flexibility and the range of application of the novel lens assembly and the corresponding coordinate measuring machine are thereby increased even more.

In a further refinement, the lens assembly has a separate cover glass, which is arranged upstream of the first lens-element group, in the region of the light-entry opening.

In this refinement, light, which enters the beam path of the lens assembly through the light-entry opening, is initially incident on a cover glass and only subsequently passes through the sequence of lens-element groups to the light-exit opening. The cover glass typically does not have a curved, optically effective (refractive) surface, but rather two planar surfaces. These can lie parallel to one another or obliquely with respect to one another.

The arrangement of a separate cover glass in front of the first lens-element group is an unusual feature for measurement lenses, since the cover glass inevitably influences the optical properties of the lens assembly or the beam path thereof. Hence, in the preferred exemplary embodiments, the optical properties of the cover glass are taken into account in the correction of the lens-element groups, i.e. the cover glass is contained in the overall correction of the lens. The provision of a separate cover glass in front of the first lens-element group is particularly unusual if the first lens-element group is designed to generate a defined longitudinal chromatic aberration, which is the case in preferred exemplary embodiments of the novel lens assembly. However, the refinement is advantageous in that a separate cover glass can be cleaned more easily and can optionally be replaced if the light-entry opening of the lens assembly is dirtied or even damaged during routine use. Accordingly, the novel lens assembly is embodied in preferred exemplary embodiments in such a way that the separate cover glass is held in a reversible and non-destructively detachable manner in the lens body.

In a further refinement, the first, second, third and fourth lens-element groups each consist of at least two lens elements. In the preferred exemplary embodiments, each lens-element group includes at least one cemented member, i.e. at least two individual lens elements in each of the four lens-element groups are connected along their optically effective surfaces in a permanent and large-scale fashion.

This refinement reduces the number of interfaces and therefore contributes to a high imaging quality over a large spectral working range. In a preferred exemplary embodiment, the four lens-element groups merely form fourteen interfaces.

In a further refinement, at least one lens-element group has a first and at least a second individual lens element, which can be displaced relative to one another within the lens-element group. The maximum movement stroke of the individual lens elements relative to one another is preferably small compared to the corresponding maximum movement strokes of the lens-element groups themselves. In one exemplary embodiment, the lens assembly comprises a piezo-actuator, which displaces the first and second individual lens elements relative to one another. Furthermore, it is preferable if the first and second individual lens elements lie against one another with a large area in a first working position and therefore form an assembled lens, while they are arranged at a defined distance from one another in a second working position.

In this refinement, the at least two individual lens elements of one of the lens-element groups can optionally be pulled apart and pushed together again. This makes it possible to generate a defined longitudinal chromatic aberration of the novel lens in a very cost-effective manner. This longitudinal aberration can advantageously be evaluated for a confocal white-light sensor. The advantage of this refinement is that the lens assembly provides an integrated, optionally activatable longitudinal aberration, without an operator of the novel coordinate measuring machine having to change a lens element and/or a cover glass.

In a further refinement, the aforementioned control curves include a set which is configured to generate a defined longitudinal chromatic aberration. Accordingly, the movable lens elements and/or the movable lens-element groups as such can be moved relative to one another in selected positions, which are selected in such a way that this results in a defined longitudinal chromatic aberration.

In a further refinement, the at least four separate lens-element groups form precisely four separate lens-element groups.

This refinement provides for a relatively simple and cost-effective design. Surprisingly, it was found that four separate lens-element groups, of which three can be moved individually as described above, can be used to realize a measurement lens assembly which satisfies the above-described requirements to an excellent extent.

In a further refinement, the at least four separate lens-element groups form five separate lens-element groups. A fifth lens-element group is preferably arranged fixed in the region of the light-exit opening, i.e. between the fourth lens-element group and the interface for connecting the camera.

An advantage of this refinement is that an image-sided telecentricity can be reached relatively easily over the whole working range of the novel lens assembly with the aid of the fifth lens-element group. This contributes to ensuring constant illumination of the image sensor in the camera over the whole working range of the lens assembly.

It is to be understood that the features mentioned above and yet to be explained below can be used not only in the respectively specified combination, but also in other combinations or on their own, without departing from the scope of the present invention.

BRIEF DESCRIPTION OF THE DRAWINGS

Exemplary embodiments of the invention are illustrated in the drawing and will be explained in more detail in the following description. In detail:

FIG. 5 shows a further sectional illustration of the lens assembly from FIG. 2, wherein the position of the lens-element groups along the optical axis is illustrated with a constant magnification for five different working distances.

DETAILED DESCRIPTION OF THE PREFERRED EMBODIMENTS

Figure 1:
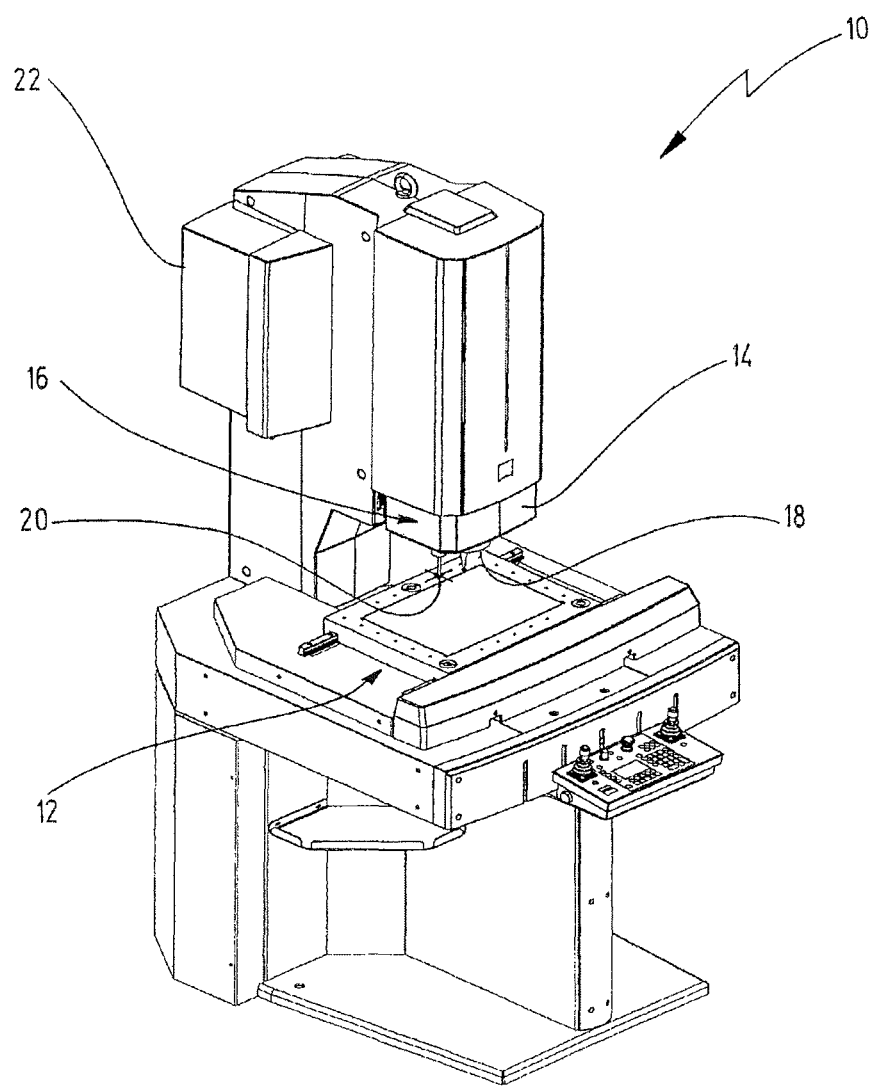
FIG. 1 shows an exemplary embodiment of the novel coordinate measuring machine in a view obliquely from the front.

In FIG. 1, an exemplary embodiment of the novel coordinate measuring machine is denoted by reference sign 10 in its entirety. In this exemplary embodiment, the coordinate measuring machine 10 has a workpiece support in the form of an X-Y table 12. A quill 14 is arranged above the X-Y table 12. The quill 14 carries a measuring head 16, which in this case holds an optical sensor 18 and a separate tactile sensor 20. Using the tactile sensor 20, the coordinate measuring machine 10 can, in a known fashion, probe a measurement point on a measurement object, which is arranged on the X-Y table 12 for this purpose. In order to probe the measurement point, the tactile sensor 20 is displaced relative to the measurement object using the X-Y table 12 and the quill 14. Spatial coordinates of the probed measurement point can then be determined in a known manner on the basis of the respective positions of the X-Y table and the quill.

The coordinate measuring machine 10 is a preferred example of a multi-sensor coordinate measuring machine, in which, in addition to the optical sensor 18, a tactile sensor 20 is employed for measuring a measurement object. Alternatively, the novel coordinate measuring machine can merely have one or more optical sensors in other exemplary embodiments.

Moreover, the present invention is not restricted to coordinate measuring machines which have the machine design illustrated in FIG. 1. In principle, the novel coordinate measuring machine can have a bridge design, portal design, horizontal-arm design or any other machine design.

Reference sign 22 denotes an evaluation and control unit, which firstly controls the drives (not denoted here) of the coordinate measuring machine 10 in order to displace the measuring head 16 relative to a measurement object. Secondly, the evaluation and control unit 22 reads in sensor data from the optical and/or tactile sensors 18, 20 and determines spatial coordinates for one or more measurement points on the measurement object depending on these sensor data and depending on the respective position of the measuring head and X-Y table. The principle method of operation of such a coordinate measuring machine is known to persons skilled in the relevant art and therefore not explained in any more detail below.

Figure 2:
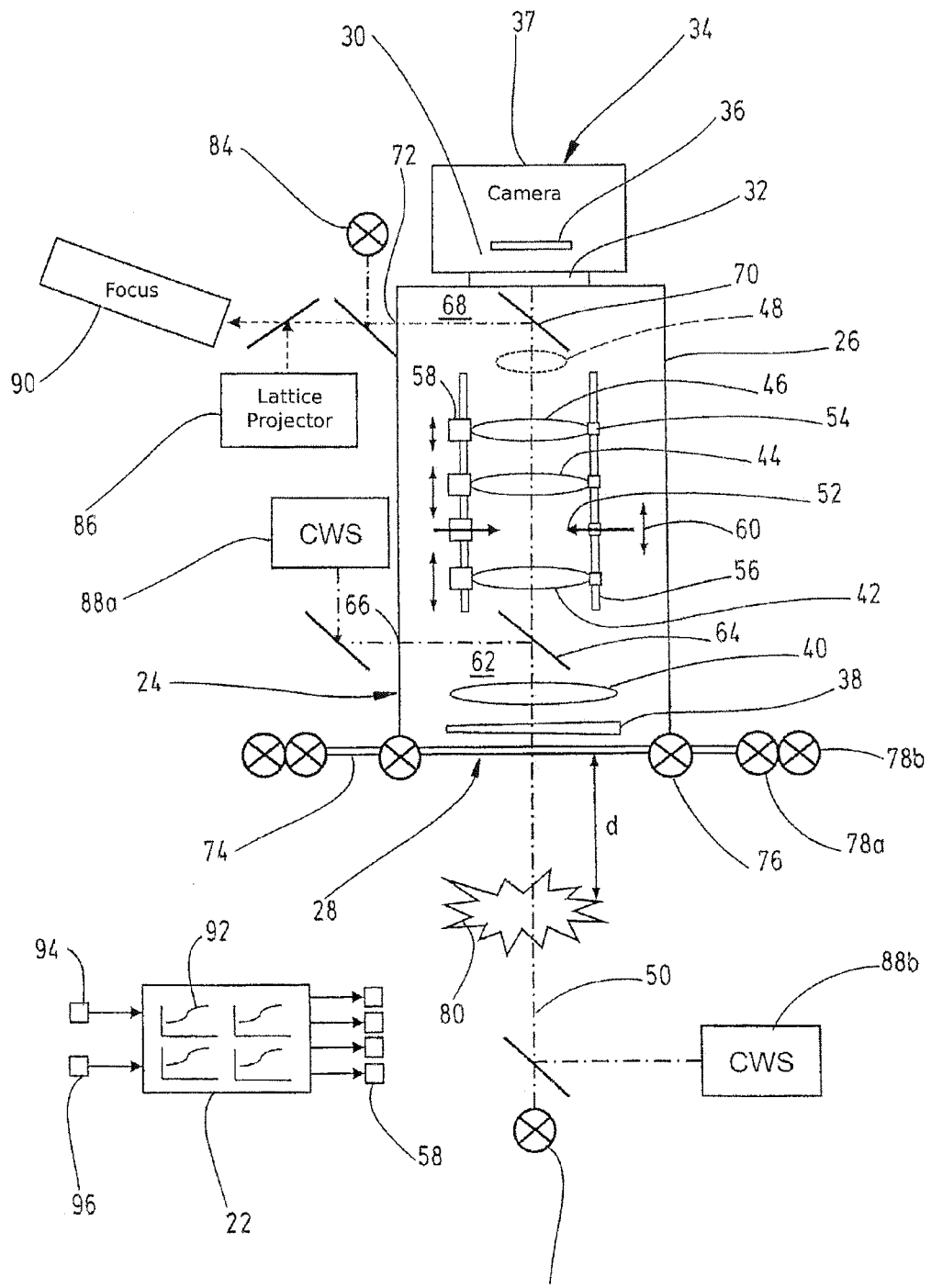
FIG. 2 shows a schematic illustration of the lens assembly from the coordinate measuring machine from FIG. 1.

FIG. 2 shows a preferred exemplary embodiment of the optical sensor 18, wherein, to be precise, the optical sensor 18 includes several optical sensors in this exemplary embodiment, which optical sensors can optionally be present and used. The novel lens assembly can also be combined with further optical sensors, e.g. with a deflectometric sensor evaluating the variation of reflections from a surface of a measurement object, when the position of the sensor relative to the surface is changed.

The sensor 18 includes a lens assembly 24 with a lens body 26. In typical exemplary embodiments, the lens body 26 is a tube with a light-entry opening 28 and a light-exit opening 30, which are arranged at opposite ends of the tube. However, in principle, the lens body 26 can also have a shape differing from that of a tube.

Formed on the light-exit opening 30 is an interface 32, which serves for connecting a camera 34 with an image sensor 36. In preferred exemplary embodiments, the interface 32 is a standardized or commercially widespread interface for coupling cameras and lens assemblies, such as a so-called F-mount or a so-called C-mount. In other exemplary embodiments, the interface 32 is a proprietary interface, which, in particular, allows to connect the housing 37 of the camera 34 permanently and directly with the lens body 26 to form one assembly, for example by screwing and/or adhesive bonding. In principle, it is also possible for other standardized or proprietary interfaces to be used for connecting the camera 34 to the lens body 26.

A cover glass 38 is arranged in the lens body 26 or on the lens body 26 in the region of the light-entry opening 28, which defines the distal end of the lens assembly 24. In some exemplary embodiments, the cover glass 38 can be a screw-top glass, which is screwed into a threaded frame at the distal end of the lens body 26. In other exemplary embodiments, the cover glass 38 can be pushed, clipped, adhesively bonded or otherwise fixedly connected to the lens body 26 in a suitable recess on the lens body 26. In the preferred exemplary embodiments, the cover glass 38 is connected to the lens body 26 in such a way that a user of the coordinate measuring machine 10 can replace the cover glass 38 without damaging the lens assembly 24.

In the illustrated exemplary embodiment, the cover glass 38 is a wedge-shaped glass plate, the thickness of which increases from one edge to the other edge, as illustrated in the simplified sectional illustration of FIG. 2. In this case, the cover glass 38 has a wedge angle, which is selected in such a way that a reflection on the front (facing the distal end of the lens assembly 24) or back side of the cover glass 38 does not reach the image sensor 36 of the camera 34. In the illustrated exemplary embodiment, the cover glass 38 is arranged in such a way that the front side thereof lies in a plane parallel fashion with respect to the light-entry opening 28, while the back side is arranged at a slight angle thereto. In preferred exemplary embodiments, however, the cover glass 38 is arranged in such a way that the front side thereof is at a slight angle with respect to the light-entry opening 28 (not illustrated here).

In other exemplary embodiments, a cover glass with plane parallel front and back sides could be arranged at a slight angle with respect to the image sensor 36 or the optical axis (explained in more detail below) of the lens assembly 24. In some exemplary embodiments, the cover glass 38 can have a position mark, for example in the form of a notch, a groove, a fit or the like, so that it can only be attached in a defined rotational position and location on the lens body 26.

In further exemplary embodiments, the cover glass 38 can be realized in the form of a thin film piece, which is clamped in the region of the light-entry opening 28 of the lens assembly 24. In some exemplary embodiments, the cover glass can be polarizing such that the light passing through is polarized and/or the cover glass can include a color filter for suppressing surrounding light.

In the illustrated exemplary embodiment, a lens-element system with a first lens-element group 40, a second lens-element group 42, a third lens-element group 44 and a fourth lens-element group 46 is arranged between the cover glass 38 and the light-exit opening 30 of the lens assembly 24. In some exemplary embodiments, a fifth lens-element group, which is illustrated here with dashed lines, is arranged between the fourth lens-element group 46 and the light-exit opening 30. The lens-element groups 40-48 define an optical axis 50 and they are respectively arranged centrally with respect to the optical axis 50 in the illustrated exemplary embodiment.

A stop 52 is arranged between the second lens-element group 42 and the third lens-element group 44. In the preferred exemplary embodiments, the stop 52 is an iris diaphragm, i.e. a stop, the clear internal diameter of which can be varied.

The second, third and fourth lens-element groups 42, 44, 46 and the stop 52 each are coupled to their own carriage 54, which can be moved along two guide rails 56. Furthermore, the three lens-element groups and the optical stop 52 are respectively coupled to an electric drive 58 in this exemplary embodiment. With the aid of the drives 58, it is possible to displace the second, third and fourth lens-element groups and the stop 52 parallel to the optical axis 50, as indicated using the arrows 60. In contrast thereto, the first lens-element group 40 and the optional fifth lens-element group 48 are arranged fixed in the lens body 26 in the preferred exemplary embodiments.

As can be identified in FIG. 2, a clear space 62 is present in some exemplary embodiments between the first lens-element group 40 and the second lens-element group 42, which clear space even remains when the second lens-element group 42 is positioned at a minimum distance from the first lens-element group 40. In the preferred exemplary embodiments, a beam splitter 64 is arranged in the clear space 62 on the optical axis 50 in order, optionally, to couple in or decouple light from a further interface 66 of the lens assembly 24. In the preferred exemplary embodiments, the second interface 66 is arranged approximately level with the beam splitter 64 on the lateral circumference of the lens body 26.

Similarly, a further clear space 68, in which a beam splitter 70 may likewise be arranged, is situated between the fourth lens-element group 46 and the light-exit opening 30 in some exemplary embodiments of the lens assembly 24. There is a further interface 72, by means of which light can be coupled in and/or decoupled, in the vicinity of the beam splitter 70. In the illustrated exemplary embodiment, the beam splitter 70 is arranged between the fifth lens-element group 48 and the light-exit opening 30. As an alternative or in addition thereto, the beam splitter 70 could be arranged between the fourth lens-element group 46 and the fifth lens-element group 48, which of course requires a corresponding clear space.

In preferred exemplary embodiments, the lens assembly 24 has a holder 74 in the region of the light-entry opening 28, on which holder different light sources 76, 78 are arranged. In the illustrated exemplary embodiment, the holder 74 carries an annular light with a plurality of light sources 78*a*, 78*b*, which are arranged around the lens body 26 at different radial distances. In some exemplary embodiments, the light sources 78*a*, 78*b* are able to generate light with different colors, for example white light, red light, green light and blue light, as well as mixtures thereof. The light sources 78*a*, 78*b* can be used to generate different illumination scenarios at different distances in front of the light-entry opening 28. At reference sign 80, a measurement object 80 is indicated schematically in an exemplary fashion, which measurement object is positioned at a distance d to the light-entry opening 28 of the lens assembly 24. The distance d represents a working distance between the lens assembly 24 and the measurement object 80, wherein this working distance can be variably set on the basis of focusing the lens assembly 24.

In the present exemplary embodiment, the light sources 76 are light sources which are integrated into the lens body 26. In some exemplary embodiments, the light sources 76 are integrated into the lens body 26 outside of the lens-element system, as illustrated in FIG. 2. In other exemplary embodiments, it is (alternatively or additionally) possible for light sources 76 to be integrated into the lens body 26 in such a way that the light generated by the light sources 76 emerges from the lens body 26 after passing through at least some of the lens-element groups and optionally the cover glass 38. In this case, the light-entry opening 28 is simultaneously also a light-exit opening.

Using the light sources 76, 78, it is possible to illuminate the measurement object 80 in a variable fashion, in order optionally to generate a light field illumination and/or a dark field illumination. In both cases, this is incident light, which impinges on the measurement object 80 from the direction of the lens assembly 24.

The coordinate measuring machine 10 comprises a further light source 82 in preferred exemplary embodiments, which further light source enables transmitted illumination of the measurement object 80. The light source 82 is accordingly arranged below the measurement object 80 or below the workpiece support of the coordinate measuring machine 10. In the preferred exemplary embodiments, the coordinate measuring machine 10 therefore comprises a workpiece support 12, which is provided with a glass plate for enabling the transmitted illumination.

Finally the optical sensor 18 has a light source 84 in these exemplary embodiments, which light source is in this case coupled to the interface 72 via a further beam splitter. By means of the interface 72 and the beam splitter 70, the light source 84 is able to couple light into the whole beam path of the lens assembly 24. In this case, the coupled-in light is cast onto the measurement object 80 by means of the lens-element system of the first to the fourth (fifth) lens-element group. In some exemplary embodiments, the light source 84 can be a laser pointer, by means of which individual measurement points on the measurement object 80 can be illuminated in a targeted fashion. In other exemplary embodiments, the light source 84 can generate a structured light pattern, such as a strip pattern or a grid pattern, which is projected onto the measurement object 80 by the lens-element system of the lens assembly 24.

In a similar fashion, various illuminations can be coupled into the beam path of the lens assembly 24 via the interface 66 and, in principle, also via the light-exit opening 30. A grid projector is illustrated in an exemplary fashion at reference sign 86. The grid projector may generate a structured light pattern, which, in this exemplary embodiment, is coupled into the beam path of the lens assembly 24 via two beam splitters and the interface 72.

As illustrated in FIG. 2, the lens assembly 24 can be combined in different ways with optical sensors, which, as an alternative or in addition to the camera 34, serve for optical measurement of the measurement object 80. In the illustrated exemplary embodiment, a first confocal white-light sensor 88*a* is coupled to the interface 66. Alternatively or in addition thereto, a further confocal white-light sensor 88*b* can, for example, be coupled into the illumination path for the transmitted illumination 82 via a beam splitter.

Reference sign 90 denotes an autofocus sensor, by means of which the distance of the measurement object 80 parallel to the optical axis 50 can be established on the basis of determining the focal position. Moreover, an optical measurement of the measurement object 80 with the aid of the camera 34 and suitable image evaluation is possible, as known to persons skilled in the relevant art in this field.

In the preferred exemplary embodiments, the lens assembly 24 has a large range of application due to the individually displaceable lens-element groups 42, 44, 46 and the individually displaceable stop 52. In the preferred exemplary embodiments, a plurality of control curves 92 are stored in a memory of the evaluation and control unit 22 or in another suitable storage device. In the preferred exemplary embodiments, the plurality of control curves 92 form a 2D family of curves, by means of which magnification and focusing of the lens assembly 24 can be set in numerous freely selectable combinations. In the illustrated exemplary embodiment, a user can enter a desired magnification 94 and desired focusing 96 into the evaluation and control unit 22. With the aid of the control curves 92 and depending on the desired magnification 94 and desired focusing 96, the evaluation and control unit 22 determines individual positions of the second, third and fourth lens-element groups along the optical axis 50, as well as an individual position and aperture diameter of the stop 52. In some exemplary embodiments of the novel method, the user can vary the working distance d to a measurement object by varying the focusing, without the sensor 18 having to be moved relative to the measurement object using quill 14. By way of example, this makes it possible to measure structures on the surface of a measurement object 80 and structures on the base of a bore (not illustrated here) of the measurement object 80 by virtue of, in the case of (almost) unchanging magnification, merely varying the focusing of the lens assembly 24 in such a way that, in one case, the structure on the surface of the measurement object 80 and, in the other case, the structure on the base of the bore lies in the focal plane of the lens assembly 24.

In other variants, a user can vary the magnification of the lens assembly 24 in the case of an unchanging or changing working distance d in order, for example, to measure details of a measurement object 80 previously measured "from a bird's eye view".

Furthermore, a user is able, in some exemplary embodiments, to modify the numerical aperture of the lens assembly 24 by opening or closing the stop 52 in order thereby to achieve a constant resolution for different working distances d. Furthermore, a user is able to vary the magnification, focusing, numerical aperture individually or combined with one another in order to adapt the lens assembly 24 in an optimum manner to the properties of the various sensors 36, 88, 90.

Figure 3:
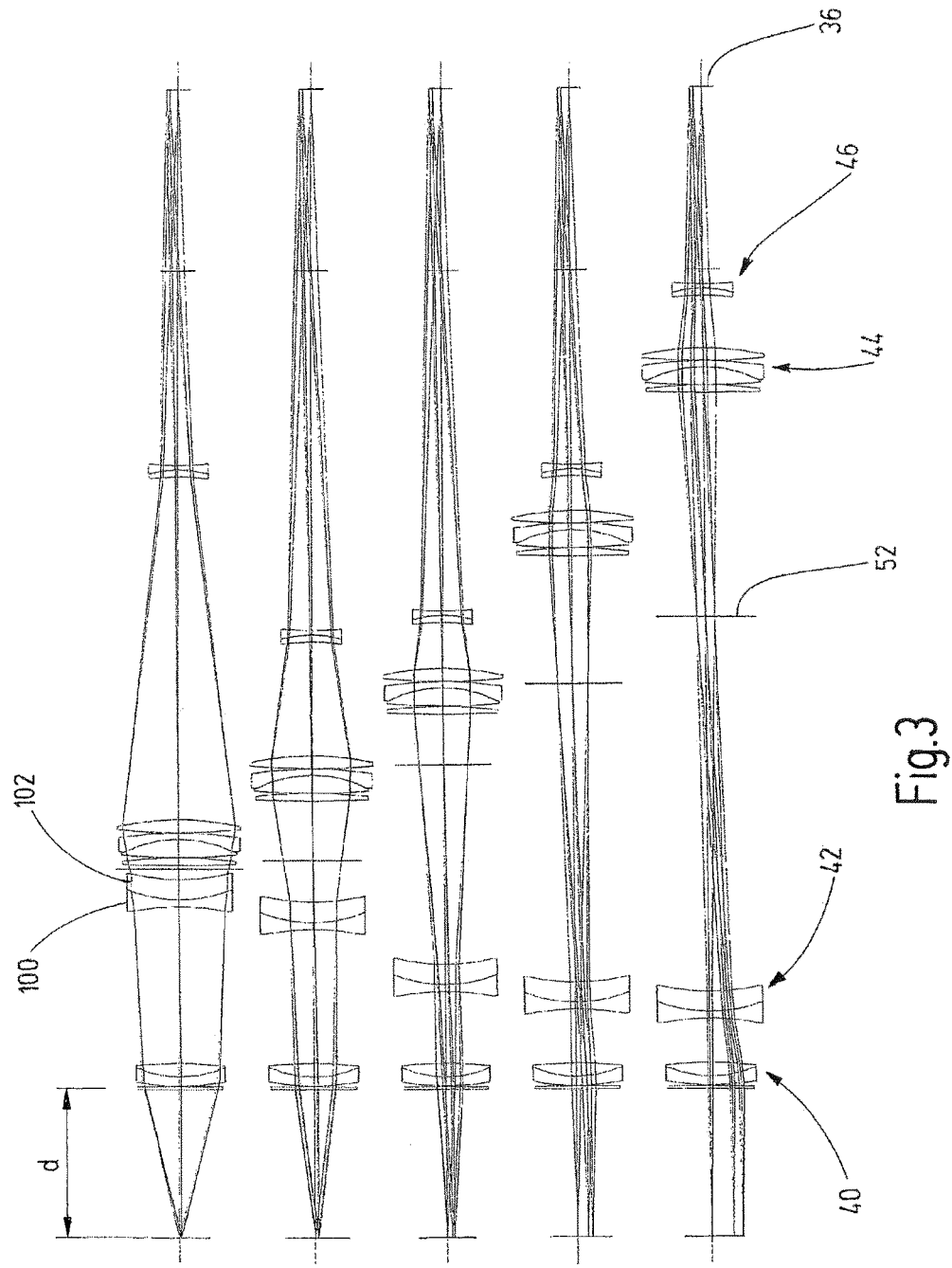
FIG. 3 shows a sectional illustration of the lens-element groups of the lens assembly from FIG. 2 in accordance with a preferred exemplary embodiment, wherein the lens-element groups are illustrated in five different working positions, which represent different magnifications for a constant working distance.
Figure 4:
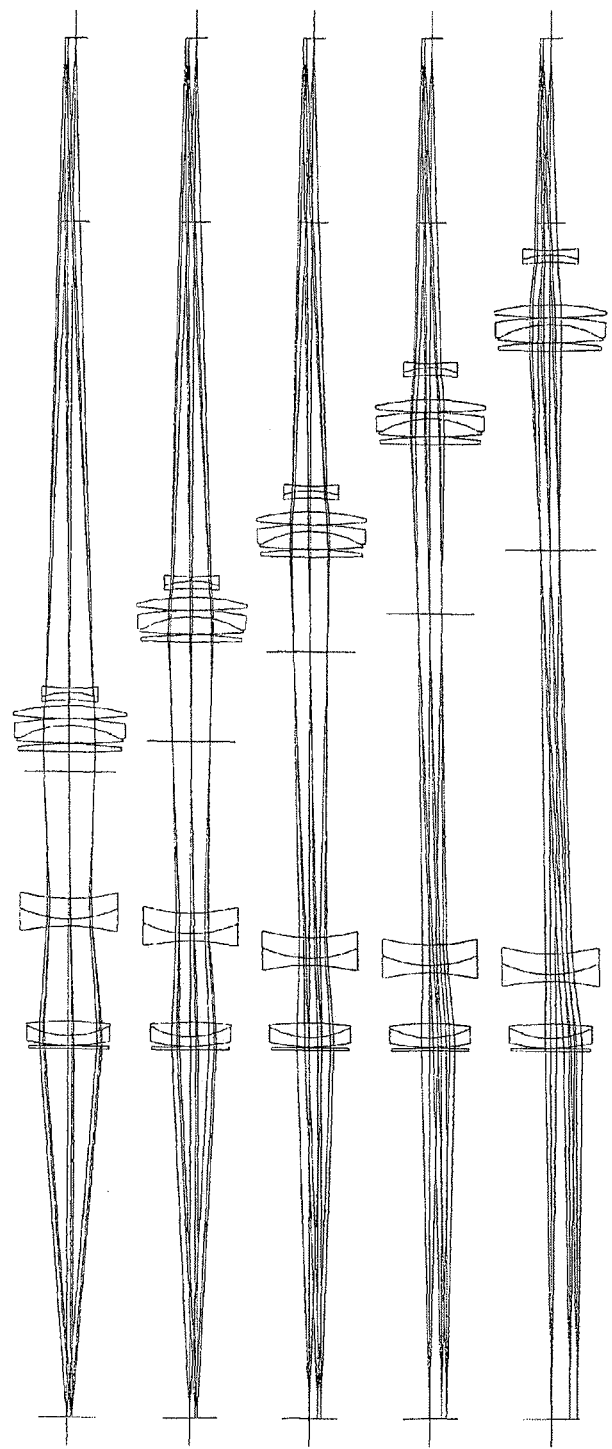
FIG. 4 shows a further sectional illustration of the lens assembly from FIG. 2 with five different working positions, which represent five different magnifications at a different working distance than in FIG. 3.

FIGS. 3 to 5 illustrate exemplary positions of the lens-element groups 40, 42, 44, 46 and the stop 52 for different working distances d and different magnifications. As can be seen from the sectional view, each lens-element group comprises several lens elements 100, 102, wherein, in this exemplary embodiment, use is made in each lens-element group of at least one cemented member consisting of least two lens elements 100, 102. In one exemplary embodiment, the lens elements 100, 102 of the first lens-element group 40 can be pushed apart with the aid of a piezo-actuator (not illustrated here) in order to selectively generate a defined longitudinal chromatic aberration.

Some of the lens-element groups comprise further separate lens elements. For a large magnification, the second and third lens-element groups stand close together, wherein the actual distance between the second and third lens-element groups additionally depends on the selected working distance d. As can be seen from FIG. 3, the second and third lens-element groups stand closer together in the case of a smaller working distance d than in the case of a larger working distance. As the magnification decreases, the second and third lens-element groups move apart, with the second lens-element group approaching the first lens-element group.

The first and second lens-element groups focus a (virtual) image cast by the measurement object in front of the stop 52. The fourth lens-element group acts as a projection lens in this case. It shifts the image into the plane of the image sensor 36. As the magnification decreases, the image cast by the first and second lens-element groups moves further away from the stop. The third and fourth lens-element groups approach one another and image, with common positive refractive power, the image on the plane of the image sensor 36.

In all preferred exemplary embodiments, the stop 52 follows the focus of the subsystem formed by the first and second lens-element groups. This allows a good field correction using the third and fourth lens-element groups.

In a preferred exemplary embodiment, the operation of the lens-element groups are divided in such a way that the first and second lens-element group determine in particular the position of the stop 52 along the optical axis and depending on the desired working distance d; it is preferred if the control curves for the second lens-element group and the stop are selected in such a manner that the stop is always positioned in the focal plane of the lens-element system consisting of the first and second lens-element groups. This allows to achieve an object-sided telecentricity.

The third and fourth lens-element groups generate a considerable part of the desired magnification and they position the image on the image sensor of the camera. The third and fourth lens-element groups advantageously also bring about an image-sided telecentricity here over a considerable part of the working range of the novel lens assembly. An image-sided telecentricity over the whole working range of the novel lens can advantageously be achieved with the optional fifth lens-element group.

In a preferred exemplary embodiment, the first lens-element group has positive refractive power. The second lens-element group has negative refractive power. The third lens-element group has positive refractive power and the fourth lens-element group once again has negative refractive power. The second, third and fourth lens-element groups each have an achromatic correction, while the first lens-element group in some exemplary embodiments produces a defined longitudinal chromatic aberration.

In another exemplary embodiment, the first and second lens-element groups together form a chromatically corrected pair and the third and fourth lens-element groups together form a chromatically corrected pair. In a further exemplary embodiment, the lens-element groups each are chromatically corrected or the chromatic correction emerges only over all lens-element groups together.

In the following, a numerical example for a preferred embodiment of the novel lens assembly is given in table 1:

TABLE 1

|    | R       | D      | N    | v    |
|----|---------|--------|------|------|
| 1  | U       |        |      |      |
|    |         | D1     |      |      |
| 2  | U       |        |      |      |
|    |         | 1.50   | 1.52 | 58.3 |
| 3  | U       |        |      |      |
|    |         | 0.50   |      |      |
| 4  | 88.48   |        |      |      |
|    |         | 5.00   | 1.74 | 32.0 |
| 5  | 40.09   |        |      |      |
|    |         | 8.00   | 1.62 | 63.0 |
| 6  | −147.48 |        |      |      |
|    |         | D2     |      |      |
| 7  | −93.05  |        |      |      |
|    |         | 3.80   | 1.49 | 66.8 |
| 8  | 53.08   |        |      |      |
|    |         | 11.10  | 1.81 | 25.2 |
| 9  | 79.72   |        |      |      |
|    |         | D3     |      |      |
| 10 | U       |        |      |      |
|    |         | D4     |      |      |
| 11 | 508.47  |        |      |      |
|    |         | 4.50   | 1.59 | 68.0 |
| 12 | −172.77 |        |      |      |
|    |         | 0.10   |      |      |
| 13 | 262.26  |        |      |      |
|    |         | 10.00  | 1.49 | 81.1 |
| 14 | −47.31  |        |      |      |
|    |         | 3.50   | 1.75 | 35.1 |
| 15 | −147.48 |        |      |      |
|    |         | 0.10   |      |      |
| 16 | 254.82  |        |      |      |
|    |         | 7.10   | 1.57 | 70.9 |
| 17 | −105.93 |        |      |      |
|    |         | D5     |      |      |
| 18 | −81.75  |        |      |      |
|    |         | 4.00   | 1.67 | 32.0 |
| 19 | −40.09  |        |      |      |
|    |         | 2.30   | 1.51 | 61.0 |
| 20 | 98.57   |        |      |      |
|    |         | D6     |      |      |
| 21 | U       |        |      |      |
|    |         | 100.00 |      |      |
| 22 | U       |        |      |      |

In addition, a numerical example representing the individual positions of the lens-element groups and the stop along the optical axis for varying magnification and focusing is given in table 2. Therefore, table 2 is a numerical example representing the control curves. D1 is the distance between the measurement object, on which the lens assembly is focused, and the first lens-element group. D2 represents the distance between the first lens-element group and the second lens-element group. D3 represents the distance between the second lens-element group and the stop. D4 represents the distance between the stop and the third lens-element group. D5 represents the distance between the third lens-element group and the fourth lens-element group. Finally, D6 represents the distance between the fourth lens-element group and the position of the image produced.

Accordingly, the distance D4 between the stop and the third lens-element group along the optical axis varies depending on the selected combination of magnification and

TABLE 2

| Distance | Magnification | | | | | | | | |
|---|---|---|---|---|---|---|---|---|---|
| | −6.25 | −4.43 | −3.14 | −2.23 | −1.58 | −1.12 | −0.8 | −0.56 | −0.4 |
| D1 | 81.00 | 81.00 | 81.00 | 81.00 | 81.00 | 81.00 | 81.00 | 81.00 | 81.00 |
| D2 | 86.59 | 89.39 | 74.10 | 49.52 | 40.03 | 34.49 | 29.97 | 27.19 | 24.58 |
| D3 | 5.64 | 3.91 | 22.94 | 75.65 | 110.01 | 136.86 | 164.32 | 184.56 | 206.51 |
| D4 | 2.00 | 23.48 | 32.69 | 19.75 | 27.65 | 47.71 | 70.74 | 100.26 | 124.00 |
| D5 | 189.56 | 106.33 | 62.51 | 37.07 | 25.52 | 20.14 | 19.09 | 22.14 | 29.59 |
| D6 | 109.05 | 169.74 | 200.61 | 210.86 | 189.64 | 153.65 | 108.73 | 58.69 | 8.16 |

| Distance | Magnification | | | | | | | | |
|---|---|---|---|---|---|---|---|---|---|
| | −3.20 | −2.48 | −1.91 | −1.48 | −1.15 | −0.89 | −0.69 | −0.53 | −0.41 |
| D1 | 121.00 | 121.00 | 121.00 | 121.00 | 121.00 | 121.00 | 121.00 | 121.00 | 121.00 |
| D2 | 59.84 | 49.70 | 44.80 | 39.19 | 35.07 | 31.39 | 28.82 | 26.42 | 24.69 |
| D3 | 48.92 | 75.13 | 91.24 | 113.65 | 133.70 | 155.01 | 172.33 | 190.65 | 205.53 |
| D4 | 2.00 | 3.38 | 18.27 | 30.48 | 47.73 | 65.40 | 87.10 | 106.30 | 125.37 |
| D5 | 37.95 | 28.10 | 21.65 | 17.52 | 15.54 | 15.45 | 17.34 | 21.27 | 27.69 |
| D6 | 244.13 | 236.53 | 216.88 | 191.99 | 160.80 | 125.59 | 87.26 | 48.19 | 9.57 |

| Distance | Magnification | | | | | | | | |
|---|---|---|---|---|---|---|---|---|---|
| | −2.65 | −2.10 | −1.67 | −1.33 | −1.05 | −0.84 | −0.67 | −0.53 | −0.42 |
| D1 | 161.00 | 161.00 | 161.00 | 161.00 | 161.00 | 161.00 | 161.00 | 161.00 | 161.00 |
| D2 | 55.45 | 51.23 | 44.84 | 38.81 | 33.53 | 30.23 | 27.30 | 25.38 | 23.61 |
| D3 | 59.23 | 70.63 | 91.12 | 115.40 | 142.21 | 162.58 | 183.69 | 199.46 | 215.57 |
| D4 | 2.00 | 21.89 | 33.82 | 43.62 | 52.24 | 68.33 | 83.02 | 101.35 | 116.07 |
| D5 | 16.21 | 13.38 | 11.68 | 10.88 | 11.03 | 12.41 | 15.07 | 19.36 | 25.47 |
| D6 | 259.95 | 235.71 | 211.39 | 184.15 | 153.83 | 119.30 | 83.77 | 47.30 | 12.12 |

| Distance | Magnification | | | | | | | | |
|---|---|---|---|---|---|---|---|---|---|
| | −2.15 | −1.76 | −1.44 | −1.18 | −0.96 | −0.79 | −0.64 | −0.53 | −0.43 |
| D1 | 201.00 | 201.00 | 201.00 | 201.00 | 201.00 | 201.00 | 201.00 | 201.00 | 201.00 |
| D2 | 51.38 | 49.12 | 43.91 | 35.63 | 31.08 | 28.74 | 27.46 | 25.54 | 22.96 |
| D3 | 70.13 | 76.88 | 94.51 | 130.78 | 156.99 | 172.88 | 182.39 | 198.07 | 221.91 |
| D4 | 10.66 | 39.87 | 54.43 | 46.41 | 52.18 | 69.65 | 92.84 | 106.98 | 109.75 |
| D5 | 3.22 | 3.72 | 4.84 | 6.10 | 7.65 | 10.00 | 13.42 | 17.80 | 23.17 |
| D6 | 257.45 | 223.26 | 195.16 | 173.93 | 144.95 | 111.58 | 76.72 | 44.46 | 15.06 |

In the preferred embodiments, the stop is always kept in the image-side focus of the subsystem formed by the first and second lens-element groups. A corresponding control curve for the axial position of the stop provides for an object-sided telecentricity. The first and second lens-element groups produce a first part of the overall magnification. The third and fourth lens-element groups produce a second part of the overall magnification. The product of the first and second part of the overall magnification gives the overall magnification. The third and fourth lens-element groups primarily provide for the focusing of the lens assembly onto a desired object plane, while the first and second lens-element groups and the stop primarily provide for the desired object-sided telecentricity. As can be seen, the distance D4 between the stop and the third lens-element group varies depending on the desired magnification and working distance (focusing), which is advantageous for a compact design having the desired flexibility. In these embodiments, individual control curves for the stop and the second lens-element group are selected such that the second lens-element group and the stop always move in opposite directions along the optical axis. In contrast, the third lens-element group may reciprocate relative to the stop along the optical axis, when the magnification is varied, as can be seen from table 2.

focusing. In addition, the distance D2 between the first and second lens-element groups, the distance D3 between the second lens-element group and the stop, and the distance D5 between the third and fourth lens-element groups each individually vary as a function of the selected combination of magnification and focusing. In the preferred embodiments, the control curves are selected such that each one of the second, third and fourth lens-element groups and the stop individually change their respective position along the optical axis as a function of magnification and focusing, such that no two elements of the first, second, third and fourth lens-element groups and the stop maintain a constant distance relative to one another.

A change in the stop diameter enables an object-sided numerical aperture to be adapted to a desired magnification. Therefore, the individual control curves include control curves for the stop that are selected such that the stop diameter is set as a function of a desired magnification, working distance (focusing) and a desired resolution.

The image cast by the first and second lens-element groups is imaged to a defined location by the third and fourth lens-element groups, which location is located at a defined fixed distance from the first lens-element group. The image sensor 36 is situated at this defined location in the preferred exemplary embodiments.

An optional fifth lens-element group may transform the image by a constant absolute value with a scalar portion of the overall magnification. In the preferred exemplary embodiments, the overall magnification is real without intermediate image. The design of the system ensures, over the whole magnification range, an exit-pupil position in relation to the image after the fourth lens-element group of between half and twice the distance to the measurement object. This is advantageous in order to be able to couple illumination light with low losses into the lens assembly 24 via the interface 72 and/or the interface 32, even without strict image-sided telecentricity.

The focal length of the subsystem formed by the first and second lens-element groups grows to larger object fields and updates the stop 52 in line with the lens-element groups wandering in the direction of the image sensor 36. Here, the beam heights at the third and fourth lens-element groups are restricted due to the stop, enabling a good overall correction of the image. The overall system is underdetermined by the paraxial basic data of magnification, focusing, telecentricity and numerical aperture. However, with the aid of the control curve for the axial position of the stop, it is possible to achieve a balanced correction of the image aberrations over a large adjustment range of the magnification. In some exemplary embodiments, the ratio between maximum magnification and minimum magnification is greater than 10 and preferably greater than 15.

In the preferred exemplary embodiments, the lens assembly 24 can have transverse chromatic aberrations in order to enable a simple and cost-effective design. As a result of this, light and images in different colors can have a slight offset across the optical axis 50 and possibly a slightly different linear magnification. In preferred exemplary embodiments, the transverse chromatic aberration and/or the linear magnification are corrected on the basis of mathematical correction calculations, which is possible in the preferred exemplary embodiments because the error image as such is continuous.

In some exemplary embodiments of the lens assembly 24, the beam splitter 70 and the cover glass 38 are designed in such a way that a polarization-optical suppression of stray light is achieved. To this end, the beam splitter 70 is designed as polarizing beam splitter and the cover glass 38 is a λ/4 plate. This is how light, which for example is created by internal reflections in the lens body, is deflected by the beam splitter 64. Only light which passed through the λ/4 plate on the outward and return path was in each case rotated by 45° in the polarization direction and can now, as a result of the polarization direction which was rotated by 90° overall, pass the beam splitter 70 in the direction of the camera 34.

In preferred exemplary embodiments, frame parts of the lens-element groups are blacked out and the lens-element interfaces are provided with antireflection coatings. Interfaces of adjacent lens elements are cemented together as far as possible. The individual assemblies have been optimized in terms of weight in order to enable fast movements of the displaceable lens-element groups and stop.

What is claimed is:

1. A coordinate measuring machine for determining spatial coordinates on a measurement object, comprising:
   a workpiece support for holding the measurement object,
   a measuring head which can be displaced relative to the workpiece support and which carries an optical sensor, and
   an evaluation and control unit configured to determine spatial coordinates on the measurement object depending on a position of the measuring head relative to the workpiece support and depending on sensor data from the optical sensor;
   wherein the optical sensor includes a lens assembly and a camera configured to record an image of the measurement object through the lens assembly,
   wherein the lens assembly has a lens body having a light-entry opening and a light-exit opening with an interface for connecting the camera,
   wherein the lens assembly further has a stop and a plurality of lens elements defining an optical axis and forming a first lens-element group, a second lens-element group, a third lens-element group and a fourth lens-element group,
   wherein the first lens-element group is arranged fixed in the region of the light-entry opening,
   wherein the second lens-element group is arranged between the first lens-element group and the stop,
   wherein the third lens-element group and the fourth lens-element group are arranged between the stop and the light-exit opening, and
   wherein the positions of the stop and the second lens-element group, the third lens-element group and the fourth lens-element group each are individually moveable relative to the first lens-element group along the optical axis.

2. The coordinate measuring machine of claim 1, further comprising individual control curves for each of the second, third and fourth lens-element groups and for the stop, with the evaluation and control unit being configured to individually move the second, third and fourth lens-element groups and the stop along the optical axis as a function of the individual control curves.

3. The coordinate measuring machine of claim 2, wherein the individual control curves are configured to alternatively generate a variable magnification with substantially constant focusing on a defined working distance or variable focusing on different working distances with a substantially constant magnification.

4. The coordinate measuring machine of claim 2, wherein the first and second lens-element groups together define a focus, which lies between the second and third lens-element groups, and wherein the individual control curves for the stop and the second lens-element group are selected such that the stop is always arranged in said focus.

5. The coordinate measuring machine of claim 1, wherein the stop has a variable aperture, and wherein the evaluation and control unit is configured to control the variable aperture depending on a position of the stop along the optical axis.

6. The coordinate measuring machine of claim 1, wherein the lens assembly further comprises a plurality of carriages and a plurality of motor drives for moving the carriages, with the second, third and fourth lens-element groups and the stop each being coupled to an individual carriage of their own.

7. The coordinate measuring machine of claim 1, wherein the first lens-element group has positive refractive power, wherein the second lens-element group has negative refractive power, wherein the third lens-element group has positive refractive power and wherein the fourth lens-element group has negative refractive power.

8. The coordinate measuring machine of claim 1, wherein the lens body has a beam splitter arranged between the first and the second lens-element groups and a further interface, said beam splitter being configured for coupling light from said further interface through the first lens-element group to the light-entry opening, or for coupling light from the light-entry opening through the first lens-element group to the further interface.

9. The coordinate measuring machine of claim 1, wherein the first lens-element group is configured to produce a defined longitudinal chromatic aberration, which is corrected for by at least one of the second, third and fourth lens-element groups.

10. The coordinate measuring machine of claim 1, wherein the lens assembly has a separate cover glass, which is arranged upstream of the first lens-element group in the region of the light-entry opening.

11. The coordinate measuring machine of claim 1, wherein the first, second, third and fourth lens-element groups each comprise at least two lens elements.

12. The coordinate measuring machine of claim 1, wherein the plurality of lens elements form exactly four separate lens-element groups.

13. The coordinate measuring machine of claim 1, wherein the plurality of lens elements form five separate lens-element groups.

14. A lens assembly for an optical coordinate measuring machine for determining spatial coordinates on a measurement object, comprising a lens body which has a light-entry opening and a light-exit opening with an interface for connecting a camera, and a plurality of lens elements and a stop which are arranged in the lens body; wherein the lens elements form at least four separate lens-element groups which together define an optical axis, wherein at least two of the four lens-element groups can be displaced along the optical axis, wherein a first lens-element group of the at least four lens-element groups is arranged fixed in the region of the light-entry opening, and wherein the positions of the stop and a second lens-element group, a third lens-element group and a fourth lens-element group of the at least four lens-element groups are individually moveable relative to the first lens-element group along the optical axis, wherein the second lens-element group is arranged between the first lens-element group and the stop, and further wherein the third and fourth lens-element groups are arranged between the stop and the light-exit opening.

15. A method for determining spatial coordinates on a measurement object, comprising the steps of:
arranging the measurement object on a workpiece support,
providing a measuring head, which comprises a lens assembly and a camera, wherein the lens assembly comprises a lens body which has a light-entry opening and a light-exit opening with an interface for connecting the camera,
positioning the measuring head relative to the workpiece support,
recording at least one image of the measurement object through the lens assembly, and
determining the spatial coordinates on the measurement object depending on the position of the measuring head relative to the workpiece support and depending on the image;
wherein the lens assembly comprises a stop and a plurality of lens elements which are arranged in the lens body,
wherein the lens elements form at least four separate lens-element groups which together define an optical axis,
wherein at least two of the four lens-element groups are moveable along the optical axis, and
wherein a first lens-element group of the at least four lens-element groups is arranged fixed in the region of the light-entry opening, and wherein the positions of the stop and a second lens-element group, a third lens-element group and a fourth lens-element group of the at least four lens-element groups are individually moved relative to the first lens-element group along the optical axis in order to achieve both a predefined magnification and predefined focusing of the measurement object in the image, wherein the second lens-element group is arranged between the first lens-element group and the stop and further wherein the third and fourth lens-element groups are arranged between the stop and the light-exit opening.

* * * * *